F. ENGEL.
WASHING AND PICKLING VAT FOR BATTERY PLATES.
APPLICATION FILED JULY 25, 1910.

1,122,887.

Patented Dec. 29, 1914.

Witnesses:
Robert H. Weir
Geo. B. Jones

Inventor:
Frank Engel
By Edwin B. H. Tower, Jr.
Atty.

UNITED STATES PATENT OFFICE.

FRANK ENGEL, OF BUFFALO, NEW YORK, ASSIGNOR, BY MESNE ASSIGNMENTS, TO CENTRAL TRUST COMPANY OF NEW YORK, A CORPORATION OF NEW YORK, TRUSTEE.

WASHING AND PICKLING VAT FOR BATTERY-PLATES.

1,122,887.  Specification of Letters Patent.  Patented Dec. 29, 1914.

Application filed July 25, 1910. Serial No. 573,681.

*To all whom it may concern:*

Be it known that I, FRANK ENGEL, a citizen of the United States, residing at Buffalo, in the county of Erie and State of New York, have invented new and useful Improvements in Washing and Pickling Vats for Battery-Plates, of which the following is a full, clear, concise, and exact description, reference being had to the accompanying drawing, forming a part of this specification.

My invention relates to a washing and pickling vat and has for its object the provision of means whereby storage battery plates may be readily immersed in a pickling fluid such as dilute sulfuric acid, and whereby the acid may be readily drawn off.

In the accompanying drawing, I have illustrated a simple and practical embodiment of my idea in which there are shown two vats adapted to be alternately filled from a common reservoir, and each having means whereby the acid may be returned quickly to said reservoir.

Figure 1:
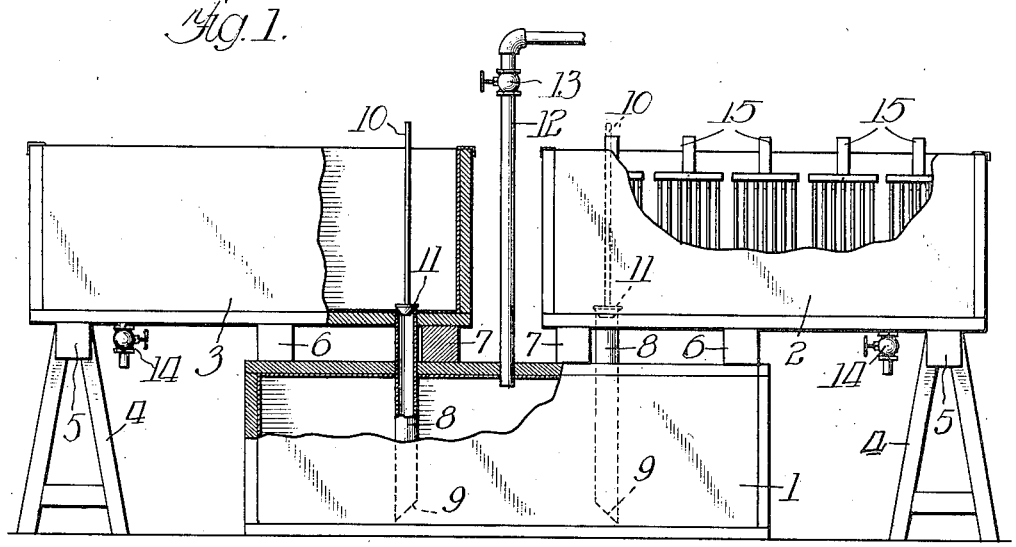
Figure 2:
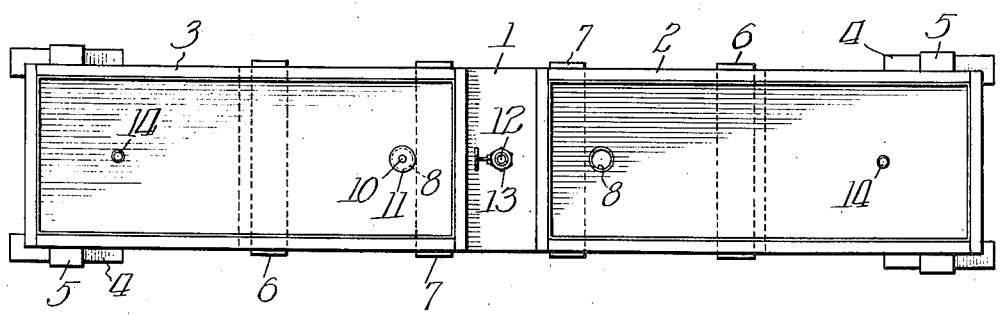

In the drawing:—Figure 1 is a vertical elevation, partly in section, of one embodiment of my invention. Fig. 2 is a plan view thereof.

The reservoir 1 consists preferably of a closed wooden tank lined with lead and adapted to contain dilute sulfuric acid. As illustrated, the tank is shown resting on the floor, although it may be provided with suitable supports. In the preferred form there are two washing and pickling vats 2 and 3 which are identical in construction so that it will be necessary to describe only one. Referring to vat 2, for example, which is preferably constructed of wood and lined with lead, there is provided preferably a support 4 for one end of the receptacle, on which support there is shown a block or beam 5. Other beams or blocks 6 and 7 are shown resting on top of the reservoir 1 and adapted to support the other end of said vat. A pipe 8, preferably of lead, extends from the bottom of said receptacle almost to the bottom of the reservoir 1 and has its lower end cut away diagonally at 9 to permit the unobstructed flow of the acid therethrough.

A rod 10, preferably of wood, is shown in dotted outline as projecting above the tank 2 and has its lower end provided with a plug 11 of rubber or other suitable material adapted to act as a stopper for the opening at the top of the pipe 8.

A pipe 12 is shown extending through the top of the reservoir 1 and connects with a supply of compressed air.

A valve 13, is preferably provided, adapted to admit compressed air to the space in the reservoir above the level of the acid, not shown, whereby said acid may be forced up through the pipe 8, into the vat above, said valve being provided with a by-pass whereby the compressed air in the reservoir may be released, when desired. The vat is further provided with a drain 14 to facilitate cleaning the same.

The operation of the apparatus is as follows: The formed battery plates 15 having been placed in either tank in the manner shown in Fig. 1, and the plug 11 having been previously removed from this tank, the air is turned on, whereby the acid is forced from the reservoir 1 into the tank until said plates are covered the proper amount. The quantity of acid used is ordinarily just sufficient to properly cover the plates when all of it that is available has been forced from the reservoir into the tank. The valve is now turned, whereupon the air in the reservoir is confined under pressure and prevents the return of acid to the reservoir. If desired, the plug 11 may be inserted in the top of pipe 8 to prevent the return of the acid, provided of course that the opening of the pipe has not been covered with plates. When the treatment has proceeded far enough to complete the pickling process, the air is released by turning the valve 13 to the by-pass position whereupon the acid returns to the reservoir and may then be forced into the other pickling vat which, in the meantime, has been filled with battery plates ready to be treated. During the treatment of this second set of plates, the plates in the first tank may be removed and a new installment substituted, whereupon the process is repeated and may be continued indefinitely.

I do not limit myself to the above details of construction, as it is obvious that various instrumentalities may be combined to secure the desired results in other ways.

Having thus described my invention, what I claim as new and desire to secure by Letters Patent of the United States is:

Apparatus of the class described, comprising an air tight reservoir for acid, two vats located above said reservoir each adjacent one end thereof, a pipe extending vertically downward from each vat to the bottom of said reservoir each of said pipes having its lower end cut away diagonally to permit the unrestricted flow of acid therethrough, a stopper adapted to fit the top of each pipe and a handle for each of said stoppers, a second pipe projecting through the top of said reservoir above the level of the acid contained therein, said second pipe connecting with a supply of compressed air, a valve for said pipe whereby compressed air may be admitted to the space above the acid level in said reservoir to force said acid into either of said vats depending on which stopper is removed and a by-pass connection for said valve whereby the compressed air in said reservoir may be released to permit the return of said acid to said reservoir.

In witness whereof, I have hereunto subscribed my name in the presence of two witnesses.

FRANK ENGEL.

Witnesses:
GEO. B. JONES,
E. R. KING.